June 4, 1940.                A. W. PRANCE                2,203,340
                          ASSIST CORD ASSEMBLY
                           Filed June 17, 1938
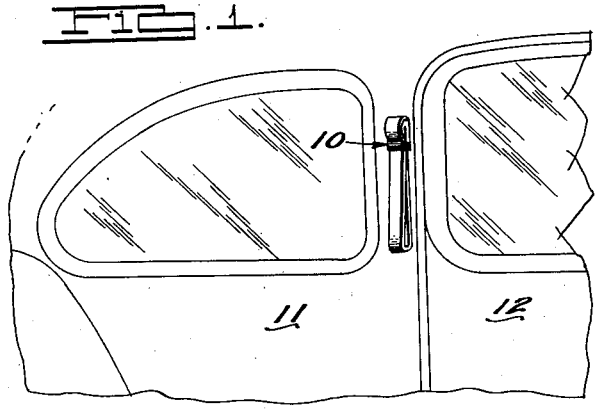
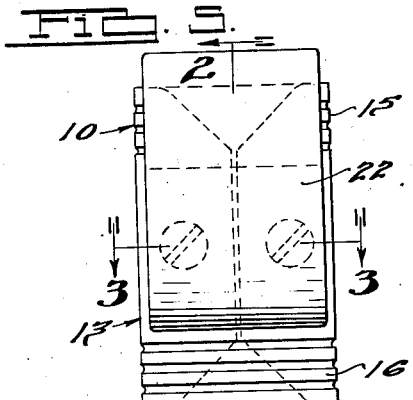
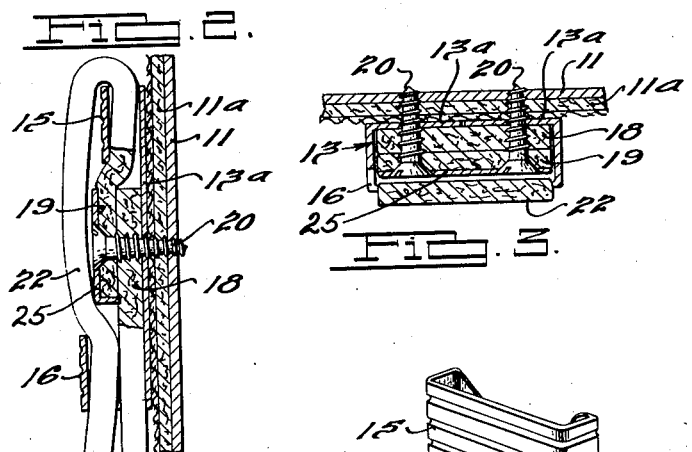
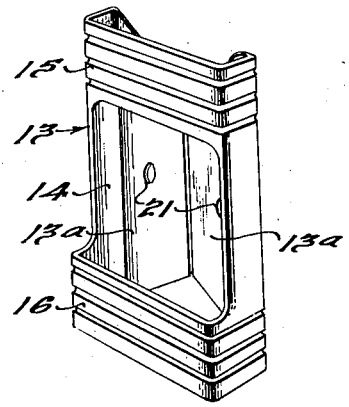
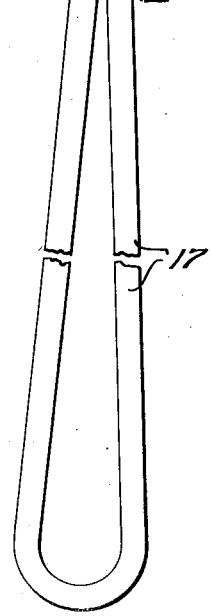
INVENTOR
Alvin W. Prance.
BY Dike, Calver & Gray
ATTORNEYS.

Patented June 4, 1940

2,203,340

UNITED STATES PATENT OFFICE 2,203,340

ASSIST CORD ASSEMBLY

Alvin W. Prance, Pleasant Ridge, Mich., assignor to Briggs Manufacturing Company, Detroit, Mich., a corporation of Michigan Application June 17, 1938, Serial No. 214,366

10 Claims. (Cl. 105—354)

This invention relates to assist cord assemblies adapted particularly although not exclusively for use in the interior of automobile bodies. In vehicle or automobile body construction it has been customary to provide so-called assist cords or straps upon the interior walls of the automobile bodies, which straps are useful for an occupant to grasp to assist him in rising or in leaving the car, to prevent a fall, or to support or brace the occupant against undesirable pitching. Heretofore assist cords or devices of this character have presented various disadvantages, such as a lack of strength, of durability, attractiveness in appearance, simplicity in construction, and effectiveness in properly transmitting strains and pulling forces to a supporting surface.

An object of the present invention is to overcome the foregoing disadvantages and provide an assist cord or strap assembly of compact, sturdy, economical, and durable construction ensuring a proper transfer of strains and pulling forces to the vehicle wall while at the same time being attractive and ornamental in appearance.

A further object of the invention is to provide an assist cord assembly simple in construction and having relatively few parts, which parts are capable of easy and quick assembly, and one which can readily be attached to or removed from its supporting surface.

A further object of the present invention is to provide an improved assist cord assembly comprising a flexible strap formed into a depending loop providing a handgrip and in which the upper ends of the strap are arranged in a three-ply formation, are retained together and are secured to the supporting wall of the vehicle or the like in improved manner.

Other objects of this invention will appear in the following description and appended claims, reference being had to the accompanying drawing forming a part of this specification wherein like reference characters designate corresponding parts in the several views.

Fig. 1 is a fragmentary perspective view of the rear interior of a vehicle body of the enclosed type, embodying one form of the present invention.

Fig. 2 is a central vertical longitudinal section taken along the line 2—2 of Fig. 5 looking in the direction of the arrows.

Fig. 3 is a plan view in cross section taken on the line 3—3 of Fig. 5 in the direction of the arrows.

Fig. 4 is a perspective view of the retainer member indicating one way in which it may be formed.

Fig. 5 is a front elevation of the form of the invention depicted in Fig. 1, the concealed portions being inserted in dotted lines.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing, one form of assist cord assembly embodying the invention is there shown in one of its applications, namely, as applied to the interior wall of an automobile body. The assembly of the present form of the invention is shown as a whole at 10 (Fig. 1) and is applied to the rear interior panel 11 adjacent a rear door 12. It is to be understood, however, that the location mentioned is but a preferred one and that other suitable and convenient places for mounting the assembly are evident and are contemplated herein.

The assembly, as shown, includes a metallic retainer member indicated generally by the reference numeral 13 resembling in its general shape a rectangular box having open ends as well as an opening or window 14 (Fig. 4) within its outer face. As this opening 14 is relatively extensive in height and width, the retainer 13 possesses a pair of integrally formed cross pieces 15 and 16 at the upper and lower portions of its outer face, respectively. The retainer 13 is preferably formed from sheet metal, such as pressed sheet steel or the like, and may be readily formed as the result of a single pressing operation because the rear wall thereof may be formed from an inward folding of each of a pair of flange-like members 13a, 13a in the manner indicated in Fig. 4. The members 13a, 13a may meet at or near the center of the retainer 13 and create the rear wall thereof. This union may be a smooth one or a concealed vertical crack may result as in the form of the invention depicted in the drawing. However, any retainer serving the purposes and performing the functions described herein is contemplated, a one-piece element merely being preferable. The retainer 13 may also possess ornamental ridges or grooves, as shown, and may be provided with a suitable ornamental and protective finish, such as a plating of chromium or other material, a coating of lacquer, a burnishing, or the like.

The assembly also includes a handgrip member or handhold 17 preferably made from a continuous strip of strong flexible material, such as a length of fabric, heavy cloth, cord, leather, or the like, one end portion 18 of which is inserted within and is maintained against the outer surface of the rear wall 13a, 13a of the retainer 13. In width the retainer 13 is dimensioned to fit about this strip of material used to form the handgrip 17 thereby aiding in holding the latter in position. The end portion 19 of the handhold 17 overlies the end portion 18 in a superimposed position thereon, and bearing against the outer face of the end 19 is a pressed metal retainer or pressure piece 25 having countersunk holes therein. The end portions 18 and 19 are maintained in compressed overlapping position by screws 20, 20 which pass through aligned holes in the overlapping layers 18 and 19 and in the pressure piece 25. The screws pass through the openings 21, 21 (Fig. 4) in the rear wall of the retainer 13 into which they fit smoothly, and are threaded into suitable screw bosses in the panel 11. It will be readily observed that the screws 20, 20 provide a removable fastening means serving to secure the ends 18 and 19 together, as well as to secure them to the retainer 13 and also to secure the retainer 13, and consequently the entire assembly, to its supporting surface, such as the panel 11. The screws 20, 20 and the openings 21, 21 are preferably aligned horizontally as shown, so that one fastening element may pass through each of the two portions of the rear wall designated 13a in Figs. 3 and 4. It is to be understood, however, that other suitable fastening means serving the purposes of the common fastening elements 20, 20 may be utilized.

The intermediate portion 22 of the handgrip 17 is a continuation of the end portion 19 thereof and is inwardly bent or folded somewhat, as shown in Fig. 2, in order that it may extend through the upper open end of the retainer 17 consequently filling the space between the cross piece 15 and the rear wall 13a of the retainer 13. The retainer 13 is so shaped and designed that this space accommodates smoothly one layer of fabric causing neither a gripping effect nor an excessive looseness.

The intermediate portion 22 of the handgrip 17 continues and is folded around the cross piece 15 doubling back in a downward direction through and within the opening 14 and lies over the outer surface of the end portion 19 as well as over the heads of the screws 20, 20 as shown in Fig. 2, thereby forming a third and outer layer of the integrally formed handgrip 17 which layer conceals the said screws 20, 20 and the end portion 19. The intermediate portion 22 of the handgrip 17 continues further and together with an extension of the end 18 thereof passes between the rear wall of the retainer 13 and the lower cross piece 16. The intermediate portion 22 bends or is folded inwardly about the end portion 19 and lies adjacent the cross piece 16 and in a superimposed position upon the extension of the end portion 18 which lies against the rear wall of the retainer 13 as best shown in Fig. 2. Moreover, the cross piece 16 of the retainer 13 is so spaced from the rear wall thereof that the two layers of the handgrip fitting therebetween in the manner mentioned are confined and firmly held in place. Both the intermediate portion 22 of the handgrip 17 and the end portion 18 thereof continue beyond the retainer 13 passing through the lower open end thereof to extend substantially below all of the mounting parts of the assembly and form the opposite sides of a loop portion especially adapted to be gripped manually as indicated in Fig. 2, particularly at the section thereof designated generally by the reference numeral 17.

Thus, it will be observed that the handgrip member is formed from a single strip of material having one upper end portion which is bent or folded back upon itself, which end is maintained in overlapping contact with the opposite end of the strip to provide a three-ply formation. Such a structure is susceptible of providing for the direct transfer of strains to a supporting surface as well as supplying a firm and secure union of the handgrip to its supporting surface.

The assist cord assembly described above may, for example, be installed upon a supporting surface such as the rear panel 11 as follows: The retainer 13 into which the end portions of the flexible strip 17 have been previously inserted in the overlapping position described above, is placed at a selected spot on the panel 11 or, more strictly, upon the interior fabric covered trim panel 11a mounted upon the metallic supporting panel 11. If desired, the retainer 13 may be positioned independently in which event the end portions are then inserted as described. Thereafter the portion 22 of the handgrip 17 is pulled upwardly through the space between the end 19 and the lower cross piece 16 forming a loop at this point, which loop is temporarily held aside while the metal screws 20, 20 are inserted through the holes in the portions 18 and 19 into the openings 21, 21 and threaded into preformed holes in the panel 11. The portion 22 is then returned to its normal position by a downward pulling of the loop portion thereof below the cross piece 16, thereby completing the installation.

From the foregoing it will be understood that the present invention provides an assist cord assembly which provides a firmer union with a supporting surface to which pulling forces are effectively transmitted. The assembly herein described is of a simple construction, is ornamental and is relatively inexpensive to manufacture as well as being easy to assemble and disassemble and to apply to and remove from its supporting surface.

I claim:

1. An assist cord assembly comprising an open ended, open faced retainer member; a one-piece flexible assist cord having its two ends overlapped and confined within the said retainer, an intermediate portion of the cord terminating at its upper end in one of said ends and being folded around the upper end of the retainer member and continuing downwardly to conceal the aforesaid confined ends of the assist cord, said intermediate portion terminating at its lower end in a depending loop; and fastening means for securing the said ends together, to the retainer member, and to a supporting surface.

2. An assist cord assembly comprising a channel-like metallic retainer member having upper and lower cross pieces defining a front opening therebetween, and a flexible strip; an intermediate section of said strip being folded about the upper cross piece to provide a concealed end portion of the said strip which overlaps the upper portion of the other end thereof, continuations of said intermediate section and also of that portion of the strip terminating in said second named end being held between the lower cross piece and the back of the retainer and depending therefrom to form a looped handgrip adapted to be manually grasped.

3. An assist cord assembly comprising a channel-like metallic retainer having an open face and open ends, thereby providing an upper and a lower bridging cross piece, a flexible assist cord comprising a strip of pliable material having a depending loop portion and three upper overlapping portions including the two ends of the strip, two of the said overlapping portions being confined within the retainer opposite said open face and the third being folded over the upper cross piece and having a downward extension passing behind the lower cross piece where it is superimposed upon an extension of one of the overlapping portions, said extensions forming opposite sides of the said depending loop; and a common means for fastening said ends and retainer to a support.

4. An assist cord assembly comprising a channel-like metallic retainer having an open face and open ends, thereby providing an upper and a lower bridging cross piece, the lower bridging piece being offset outwardly with respect to the vertical plane of the upper bridging piece, a flexible assist cord comprising a strip of pliable material having a depending loop portion and three upper overlapping portions including the two ends of the strip, two of the said overlapping portions being confined within the retainer opposite said open face and the third being molded over the upper cross piece and having a downward extension passing behind the lower cross piece where it is superimposed upon an extension of one of the overlapping portions, said extensions forming opposite sides of the said depending loop; and a common means for fastening said ends and retainer to a support.

5. An assist cord assembly comprising a retainer, a continuous flexible assist cord having its two ends confined in overlapping relationship within the retainer, and having an intermediate portion terminating in one of said ends folded around a portion of said retainer and laced through another portion thereof in such a way that the said intermediate portion overlies the overlapping ends thereby forming a third and outer layer of the assist cord, and common means for holding the said ends in place and for removably securing the assembly upon a supporting surface.

6. An assist cord assembly comprising a retainer member, a flexible assist cord having its two ends overlapped and confined within the retainer member, a portion of said cord terminating in one of said ends and being folded over a part of said retainer to conceal the overlapped confined ends of the cord, said portion continuing beyond the retainer member to form a loop, and fastening means for securing the said ends together and to a supporting surface.

7. An assist cord assembly comprising a retainer member, a flexible assist cord formed into an elongated loop depending from the retainer member and having its two ends confined within the retainer member with one end overlying the other end, the portion of said cord terminating in said overlying end being folded over a part of said retainer member to conceal the confined ends, said portion continuing beyond the retainer member to form one side of said loop while the portion of the cord terminating in the said underlying end continues beyond the retainer member to form the other side of the loop.

8. An assist cord assembly comprising a channel shaped retainer member; and a flexible assist cord having its two ends overlapped and adjacently confined by said retainer member, an extension of one end folded around the upper end of the retainer member and downwardly to conceal said ends and extension of the other end, said extensions projecting below said retainer member and uniting to provide a downwardly hanging looped portion of said cord, the aforesaid ends being adapted to be secured together and to a support.

9. An assist cord assembly comprising a retainer member, a flexible assist cord having its two ends confined by said retainer member in adjacent relationship, said assist cord having an extension of one end folded down to conceal the said ends, and means concealed by said extension for securing said ends to a support independently of said extension, said retainer member having means positioned above said securing means for maintaining said extension in folded position, the said extension together with an extension of the other end continuing beyond said retainer to form a loop portion of the assist cord depending from the retainer member.

10. An assist cord assembly comprising a flexible assist cord consisting of a strip of flat textile material having three upper overlapping portions including the two ends of the strip, said ends being placed in adjacent relationship and an extension of one end being folded back to overlie and conceal the said ends and to form the third of the said overlapping portions, the portion of the strip oppositely disposed from the said overlapping portions forming a depending loop operable as a handgrip; a common retainer member for confining the overlapping portions in the aforesaid position, and means concealed by said extension for clamping said ends together in position for attachment to a supporting surface, said retainer member having means positioned above said clamping means for maintaining said extension in folded position.

ALVIN W. PRANCE.

CERTIFICATE OF CORRECTION.

Patent No. 2,203,340. June 4, 1940.

ALVIN W. PRANCE.

It is hereby certified that error appears in the printed specification of the above numbered patent requiring correction as follows: Page 3, first column, line 34, for the word "molded" read --folded--; and that the said Letters Patent should be read with this correction therein that the same may conform to the record of the case in the Patent Office.

Signed and sealed this 27th day of August, A. D. 1940.

(Seal)

Henry Van Arsdale,
Acting Commissioner of Patents.